May 22, 1956         I. WILLIAMS         2,746,564

SEPARATING CARBON FROM GASES

Filed May 31, 1955         2 Sheets-Sheet 1

FIG 1

INVENTOR.
IRA WILLIAMS
BY
*Edwin C. Woodhouse*

May 22, 1956 — I. WILLIAMS — 2,746,564
SEPARATING CARBON FROM GASES
Filed May 31, 1955 — 2 Sheets-Sheet 2

INVENTOR.
IRA WILLIAMS
BY
Edwin C. Woodhouse

United States Patent Office 2,746,564
Patented May 22, 1956

2,746,564

SEPARATING CARBON FROM GASES

Ira Williams, Borger, Tex., assignor to J. M. Huber Corporation, Locust, N. J., a corporation of New Jersey Application May 31, 1955, Serial No. 511,944

12 Claims. (Cl. 183—121)

This invention relates to a process for separating carbon from gases and, more particularly, for recovering furnace carbon black from the gaseous suspensions thereof produced by carbon black furnaces.

This application is a continuation-in-part of my copending application Serial No. 216,770, filed March 21, 1951, for "Separating Carbon From Gases."

At the present time much of the carbon black is produced by the thermal decomposition of hydrocarbons in contact with hot gases or flames in furnaces, and particularly by the thermal decomposition of low cost residue liquid hydrocarbons that are obtained as by-products in the cracking of petroleum. Such furnaces produce hot gaseous suspensions of furnace carbon black in high concentration. Usually, such hot gaseous suspension has been passed through coolers where it is sprayed with water to cool the gaseous suspension by evaporation of the water. Originally, such cooled gaseous suspensions were passed through bag filters for the collection of the carbon black from the gaseous suspension. This method collected the carbon black efficiently and provided stack gases which were substantially free of carbon. However, such operation was troublesome and expensive to operate.

Because of the disadvantages and difficulties involved in the use of bag filters, they have been largely replaced by dry precipitating apparatus, usually electrical precipitators, commonly known to the art as Cottrell precipitators, and cyclone collectors. In this apparatus, the cooled gaseous suspension of carbon black is passed between high potential electrodes to flocculate the carbon and then through cyclone collectors to collect the flocculated carbon. Such apparatus is shown by Hanson et al. in Patent 2,368,828 and by Mitchell et al. in Patent 2,417,606. Such method and apparatus was fairly successful and produced stack gases fairly free of carbon so long as the furnaces were operated to produce the carbon black at a low rate from natural gas. However, it has become desirable to produce carbon black at a high rate and particularly from oil and, under such circumstances, the electrical precipitators and cyclone collectors are unable to satisfactorily remove the carbon black from the gaseous suspension, resulting in poor recovery of the carbon black and in stack gases containing large amounts of carbon black. Due to the high concentration of the carbon black in such stack gases, the carbon black forms tiny pellets which do not remain suspended in the gases for long periods of time but become deposited on the ground, buildings, and other objects in a radius of several miles from the carbon black plant. This constitutes an extreme nuisance and also results in a serious loss of valuable carbon black.

Quite recently, it has been proposed to recover the carbon black from the stack gases by scrubbing such gases with water or with an aqueous slurry of carbon black which may contain a wetting agent. In practice, such scrubbing processes have been beset with many difficulties, particularly in the control thereof and in maintaining them in continuous operation over long periods of time. When plain water, with or without a wetting agent, is used as the scrubbing liquid, such processes and apparatus require large amounts of water to keep the carbon flushed out of the scrubbing apparatus and to effectively remove the carbon black from the gaseous suspension because a large proportion of the carbon black exists in the form of minute particles which are quite difficult to wet. For example, I have found that, when the stack gases from a carbon black plant, using electrical precipitators and cyclone collectors, are so washed with plain water or water containing a wetting agent, the water from the scrubbing apparatus contains from about 0.05% to about 0.25% of carbon black by weight, and often less than 0.2% of carbon black. The recovery of the carbon black from such extremely dilute slurries involves the handling, settling, filtration, or evaporation of very large volumes of water requiring large and expensive equipment and, in the case of spray drying, large amounts of heat. Since the best carbon black sells for only about seven and one-half cents per pound, the recovery thereof from such large amounts of water has been objectionably expensive.

In order to overcome the disadvantages of the last mentioned procedure, it has now been proposed to employ a recirculating system wherein a part of the aqueous slurry of carbon black, passing from the scrubber, is continuously recirculated to the scrubber and there used as the scrubbing liquid, whereby the concentration of carbon black in the aqueous slurry is greatly increased, and the rest of the aqueous slurry from the scrubber is continuously removed from the system as product slurry. The product slurry is treated in various ways to recover the carbon black therefrom. One method, proposed for recovering the carbon black from the product slurry, is to spray such product slurry into the hot gaseous suspension from the carbon black furnace to cool the gaseous suspension and, at the same time, to evaporate the water from the product slurry and to resuspend the carbon black therein in the gaseous suspension so that it will be recovered in dry form in the electrical precipitators and the cyclone collectors.

Such recirculating systems present new and difficult problems. The systems operate erratically and are difficult to control. The viscosity of the slurries therein vary widely, frequently becoming so high as to plug the systems and render them inoperative. The reasons and causes of such difficulties have not been understood or fully recognized.

The invention herein is based upon the discovery of the causes of the difficulties involved in such recirculating systems and comprises a simple and inexpensive method of overcoming such difficulties which is easy to operate and control and makes it possible to operate the systems in a smooth manner over long periods of time without plugging and with effective control of the viscosities of the slurries.

It is an object of the present invention to provide a new and improved method for effectively recovering furnace carbon black from gaseous suspensions thereof such as are produced in carbon black furnaces and which effectively overcomes the problems and disadvantages of other processes hereinbefore discussed. Another object is to provide a new and effective method for cleaning the carbon from the stack gases of carbon black furnace plants. A further object is to provide a process for separating furnace carbon black from gaseous suspensions thereof in the form of finely-divided particles or pellets or both. Further objects are to advance the art. Still other objects will appear hereinafter.

The above and other objects may be accomplished in accordance with this invention which comprises continuously passing a gaseous suspension of furnace carbon black through a washing zone and therein washing the carbon black from the suspension with one or more attenuated streams of a scrubbing liquid which consists essentially of a fluid aqueous slurry of such carbon black, continuously passing the resulting mixture of scrubbing liquid and carbon black from the washing zone and into a body of such scrubbing liquid in a reservoir, said body of scrubbing liquid having a volume of from about 160 gallons to about 1200 gallons for each pound of carbon black that is normally washed from the gaseous suspension in one minute and normally containing said carbon black in a concentration between about 1.25% and 10% by weight but less than that concentration which will increase the viscosity of the scrubbing liquid to above 15 centipoises at 30° C., dispersing said mixture of scrubbing liquid and carbon black that is passed from the washing zone approximately uniformly throughout said body of scrubbing liquid and maintaining the carbon black in suspension in said body of scrubbing liquid by agitating said body of scrubbing liquid, maintaining said body of scrubbing liquid in the reservoir at a substantially constant volume by the automatic addition of water thereto, continuously recirculating scrubbing liquid from said body thereof to the washing zone as the scrubbing liquid in said zone, continously withdrawing scrubbing liquid from the body thereof at a substantially constant rate equivalent to the average rate at which the carbon black is washed from the gaseous suspension, and passing said withdrawn scrubbing liquid to a carbon black recovery system and there separating the carbon black from the scrubbing liquid. Such process may be started with a scrubbing liquid which contains the carbon black in the desired concentration. At times, the process will be started with a scrubbing liquid which initially consists essentially of water, continuously recirculating such scrubbing liquid through the washing zone, without withdrawing scrubbing liquid from the system, until the carbon black in the scrubbing liquid in the system is increased to the desired concentration within the range above set forth, and then starting the continuous withdrawal of the scrubbing liquid from the body thereof in the reservoir while continuing the recirculation of the scrubbing liquid through the washing zone.

By employing the body of scrubbing liquid of the indicated size and operating the system in the manner described, the process can be efficiently operated over long periods of time, and problems and difficulties encountered in other proposed systems for washing carbon black from gaseous suspensions are effectively overcome. The scrubbing liquid which is withdrawn from the body thereof in the reservoir (product slurry) has a substantially constant, high concentration of carbon black such that it can be economically recovered from the liquid by spraying it into the hot gaseous suspension from the carbon black furnace, by filtration, and the like, and renders it simple and easy to operate and control such recovery systems.

The viscosity of aqueous slurries or suspensions of furnace carbon black varies with the size of the particles thereof and with their degree of agglomeration or flocculation, increasing with decrease in particle size but usually not in proportion thereto, decreasing with increase in their degree of agglomeration, and increasing rapidly with increase in the concentration of carbon black in the slurries. The size of the particles of furnace carbon black varies from about 18 millimicrons to about 70 millimicrons in diameter, such size and the degree of agglomeration depending upon the furnace, the manner and conditions of its operation, and the materials which are used to make the carbon black. The following table shows the change of viscosity at 30° C. in centipoise (cp.) with change in concentration of aqueous slurries of a typical high abrasion furnace black (HAF) having a mean particle diameter of 28 millimicrons, which is the type of carbon used in tire treads.

*Table*

WITHOUT DISPERSING AGENT

| Percent Concentration | 12 | 9 | 7.5 | 6 | 4 | 3 | 2 |
|---|---|---|---|---|---|---|---|
| cps | 340 | 135 | 85 | 52 | 24 | 13 | 6 |

WITH 1% "MARASPERSE" (LIGNIN WETTING AGENT)

| Percent Concentration | 12 | 9 | 7.5 | 6 | 4 | 3 | 2 |
|---|---|---|---|---|---|---|---|
| cps | 50 | 18 | 12 | 6.5 | 3 | 2.5 | 1.5 |

Another typical furnace carbon black, having a mean average particle size of 58 millimicrons produces a slurry having a viscosity of 15 cps. at a concentration of 3.5–4% in the absence of a wetting agent, and at a concentration of about 9% in the presence of 1% of efficient wetting agent, the carbon black being in the form of dispersed agglomerates which slurries, if passed through a colloid mill, would become much more viscous.

Slurries, having a viscosity of the order of 25 cps., are too viscous for effective operation and easy spraying, and small increases in concentration thereof renders them too viscous to flow in most systems. Furthermore, slurries containing carbon black in a concentration materially greater than 10% by weight, even when sufficiently fluid to flow readily, become extremely corrosive and abrasive whereby they quickly destroy equipment in which they are circulated. On the other hand, slurries, containing the carbon black in a concentration of less than 10% by weight and having a viscosity up to about 15 cps., are sufficiently fluid for effective operation, can be sprayed easily, and are not objectionably corrosive or abrasive.

Even with slurries containing carbon black in a concentration of less than 10% by weight and having a viscosity of 15 cps. or less, it is necessary to control the operation so as to maintain within a narrow range variations in the concentration of the carbon black in the scrubbing liquid that is introduced into the washing zone and in the slurries that are withdrawn as product slurries and treated in the carbon black recovery systems. Wide variations in the concentration and viscosity of such slurries seriously affect the operation of the carbon black recovery systems and the washing systems, and must be avoided in order that such systems may be controlled and operated in a satisfactory, efficient, and practicable manner. Ordinarily, the process should be controlled so that the variations in concentration do not exceed 0.5% by weight of carbon black based on the slurry, preferably not more than 0.3%, particularly where the product slurry is sprayed into the hot gaseous suspension in the cooling zone. In some cases, such as where the carbon black is recovered from the product slurry by filtration, such variations may be as much as about 0.75%.

The gaseous suspensions, which enter the washing zone, are quite hot. Those, which have been cooled by a spray, are usually at a temperature of from about 212° F. to about 500° F. and are not saturated with water. Therefore, large amounts of water are evaporated from the scrubbing liquid as it passes through the washing zone. The amount of water so evaporated varies widely and uncontrollably due to unavoidable fluctuations in the temperature of the carbon black furnace, in the temperature obtained in the cooling zone and the dry precipitating zones, in the temperature, pressure and humidity of the surrounding atmosphere, and in the pressure in the system. Such evaporation of water increases the concentration of carbon black in the scrubbing liquid passing through the washing zone, in addition to the increase in concentration due to the carbon black washed from the gaseous suspension, and hence increases the viscosity of the scrubbing liquid. The variations in the amount of water evaporated results in fluctuations in the concentration of carbon black in the scrubbing liquid and wide variations in the viscosity thereof.

If the scrubbing liquid which enters the washing zone is at or near the maximum concentration or viscosity which can be employed effectively, such loss of water by evaporation tends to cause the scrubbing liquid to frequently become too viscous to effectively wash the carbon black from the gaseous suspension and even so viscous that it does not flow through the system, whereby the system becomes plugged and inoperative. In some systems, no provision is made for automatically and immediately replenishing the water lost by evaporation (in addition to that removed in the product slurry), whereby such systems are operative for only short periods of time before they become plugged and inoperative due to depletion of the water therein to the extent that the scrubbing liquid becomes too viscous to flow through the system.

In this invention, the scrubbing liquid, passing from the washing zone, is passed into and mixed with a relatively large body of scrubbing liquid automatically maintained at a substantially constant volume, whereby variations in the concentration and the viscosity of the scrubbing liquid from the washing zone have but little effect on the concentration and the viscosity of the body of scrubbing liquid. Since the concentration and the viscosity of the body of scrubbing liquid is normally maintained well below the maximum which will readily flow through the system, such small variations in concentration of the carbon black therein do not cause it to become so viscous as to lose its efficiency as a scrubbing liquid or as to plug the system and render it inoperative.

Also, it has been found that carbon black accumulates on the solid surfaces of dry precipitating zones, such as in electrical precipitators and cyclone collectors, and in conduits preceding the washing zone. Such accumulation continues until the weight thereof is sufficient to overcome its force of adhesion to such solid surfaces, when it suddenly releases (breaks away) and passes into the washing zone as slugs of carbon black in addition to that which is normally present in the gaseous suspension. This occurs at frequent intervals. Ordinarily, such slugs of carbon black are of the order of 10 to 25 pounds and, in rare cases, may amount to as much as 50 pounds. The scrubbing liquid in the washing zone, if not too viscous, will catch such slugs of carbon black and carry them from the washing zone. However, since furnace carbon black is wetted slowly and only with difficulty, some of the carbon black normally washed from the gaseous suspension and large proportions of the carbon black in such slugs are not completely wetted and absorbed by the scrubbing liquid in the washing zone, whereby the effluent from the washing zone is usually a mixture of scrubbing liquid and incompletely wetted or dry carbon black.

In this invention, such mixtures of scrubbing liquid and incompletely wetted or dry carbon black from the washing zone are passed to the relatively large body of agitated scrubbing liquid in a reservoir. The incompletely wetted and dry carbon black tends to float on the surface of the body of scrubbing liquid, but the agitation causes it to be gradually absorbed in and dispersed approximately uniformly throughout the body of scrubbing liquid. The size of the body of scrubbing liquid and the normal concentration of carbon black therein are correlated to each other so that the effect of such slugs of carbon black on the concentration and viscosity of the body of scrubbing liquid are greatly decreased by dilution so that the viscosity of the scrubbing liquid is not increased beyond that which can be tolerated or to the point where it becomes ineffective, or tends to plug the system, or seriously affects the operation of the carbon black recovery system. Such small effects are soon eliminated by the withdrawing of product slurry from the body of scrubbing liquid at a substantially constant rate equivalent to the average rate at which the carbon black is washed from the gaseous suspension.

In the absence of the large agitated body of scrubbing liquid, the incompletely wetted and dry carbon black will reach and plug relatively small orifices in the equipment, such as those in screens, valves, spray heads, and the like. In other cases, where the mixture is passed through a small zone where it is subjected to extreme conditions of agitation sufficient to wet all or substantially all of the carbon black without large dilution, the incorporation of such slugs of carbon black in the scrubbing liquid greatly increases the concentration and the viscosity in the scrubbing liquid, frequently to such an extent as render the scrubbing liquid ineffective or inoperative.

In systems of this character, the unit for recovering the carbon black from the product slurry sometimes becomes inoperative by the failure of pumps and the like whereby the withdrawing of product slurry from the washing system stops. Frequently, it becomes necessary to temporarily shut down the carbon black recovery system for the purpose of changing spray nozzles or heads and to replace or repair slurry pumps and the like. It usually requires a period of time, of the order of 10 minutes, to shut down the carbon black furnaces and to stop the flow of carbon black to the washing system. This tends to increase the viscosity of the scrubbing liquid in the washing system to the point where the system becomes plugged. Furthermore, it is not desirable to shut down the furnace and the washing system in order to make minor changes and repairs in the carbon black recovery system. Such shut downs result in large losses of time and production and are quite costly.

It is a very important feature of this invention that the size of the body of scrubbing liquid, automatically maintained at substantially constant volume, and the normal concentration of carbon black therein are so designed and controlled in correlation with each other as to permit the continued operation of the carbon black furnace and the washing system for material periods of time when the removal of product slurry from the system is stopped. Such periods of time may be as short as 10 minutes, but normally should be of the order of 25 minutes to 1 hour, and may be longer if desired. Thereby, sufficient time is provided for temporarily shutting down the carbon black recovery system for the purpose of changing spray heads, replacing or repairing pumps, making other minor changes or repairs, or switching to a different recovery system without shutting down the carbon black furnace, the dry precipitating equipment or the washing system. Also, sufficient time is provided for shutting down the carbon black furnace, if that is determined to be necessary or desirable.

The continued operation of the carbon black furnace and of the washing system during such periods of time will result in a gradual increase in the concentration of carbon black in the body of scrubbing liquid. However, the total increase in concentration and viscosity over such periods will be within the limits that can be tolerated and will not seriously affect the efficiency of the scrubbing liquid or render it inoperative. Therefore, when the necessary changes or repairs have been made in the carbon black recovery system, it can again be placed in operation and the removal of product slurry from the body of scrubbing liquid resumed without difficulty. Thus, it is apparent that the process of this invention eliminates a large proportion of the frequent interruptions to the production of carbon black which have been encountered heretofore and permits satisfactory continuous operation over much longer periods, with large resultant economies in costs, time and labor.

The washing of the carbon black from the gaseous suspension in a washing zone with an attenuated stream of the scrubbing liquid is carried out in scrubbers of the character that are well known in the art for scrubbing solids from gases with water and in accordance with the well known principles and methods employed in such scrubbers. In such scrubbers, the gaseous suspension impinges at high velocity against one or more attenuated streams of water, the water necessarily being large in volume in order to absorb the solids, to wash the solids off the wet surfaces of the scrubber and to effectively carry such solids out of the scrubbers.

I may employ scrubbers in which the attenuated stream of scrubbing liquid is in the form of a heavy spray flowing cocurrent or countercurrent to the gaseous suspension. The scrubbers may be in the form of towers containing perforated plates and bubble caps, as in fractionating towers, wherein the attenuated stream of scrubbing liquid flows down over the plates and caps and through the perforations countercurrent to the flow of gas.

The most effective and preferred scrubbers contain two vertical series of baffles extending inwardly and downwardly toward each other so as to form restricted passages for the gaseous suspension. Representative scrubbers of this character are those shown by Brundage in Patent 2,203,592 and by Corner et al. in Patent 2,050,160. The scrubbing liquid is sprayed in at the top and flows down over the walls and the baffles in the form of thin films or sheets. The gaseous suspension may be caused to flow upward through the scrubber, but, more usually, is introduced at the top and flows downward through the scrubber. The gaseous suspension is introduced under pressure so that it flows through the scrubber at a velocity such that, as it passes through the restricted passages formed by the opposing baffles, it becomes violently turbulent. Such turbulence provides the desired high velocity currents in the gas and causes the gas to pick up droplets of scrubbing liquid flowing off the edges of the baffles and to carry the droplets to the undersides of the baffles and over all the walls of the scrubber. The average velocity of the gas through the scrubber may be most conveniently measured by the pressure drop. A pressure drop through the scrubber of from about 1 to about 6 inches of water will usually be sufficient to produce the desired turbulence for effectively washing furnace carbon black from gaseous suspensions thereof.

When the gaseous suspension flows through the scrubber countercurrent to the scrubbing liquid, the scrubbing liquid will flow from the scrubber into a reservoir and the cleaned gas will be separated from entrained liquid at the other end of the scrubber or in a separate chamber and then passed to the atmosphere. Where cocurrent flow of the gaseous suspension and the scrubbing liquid is employed in the scrubber, they will be passed out of the scrubber as a mixture and into a chamber where the cleaned gas will be separated from the scrubbing liquid and passed to the atmosphere, and the scrubbing liquid will be passed to a reservoir. Such separating chamber may be any type of liquid-gas separator, of which many are well known to the art. Preferably, the separating chamber will be a cyclone separator which may, desirably, be followed by a centrifugal fan at its gas exit, which fan throws down the liquid from any mist passing through the cyclone separator.

The mixture of scrubbing liquid and carbon black, flowing from the washing zone (the scrubber and the liquid-gas separating chamber), is passed into a body of scrubbing liquid in a reservoir. The reservoir is conveniently in the form of a tank. Incompletely wetted carbon black tends to form dust emulsions which float on the surface of the scrubbing liquid in the reservoir. Also, carbon black tends to settle from aqueous suspensions thereof. The body of scrubbing liquid in the reservoir is subjected to good agitation in order to cause the incompletely wetted carbon black to be absorbed in the body of scrubbing liquid, to disperse the mixture of scrubbing liquid and carbon black which flows from the washing zone approximately uniformly throughout the body of scrubbing liquid, and to maintain the carbon black in suspension therein. It is apparent that completely uniform dispersion is impossible because of the continuous introduction of the scrubbing liquid from the scrubber or liquid-gas separator into the body of liquid, the continuous removal of scrubbing liquid for recirculation and for separation, and the addition of replenishing water thereto. Such flow of liquids into and out of the reservoir result in agitation of the body of scrubbing liquid. Such agitation will usually be sufficient to maintain the carbon black in suspension when the scrubbing liquid contains a wetting agent because the wetting agent decreases the dust emulsions and improves the dispersion of the carbon black. In some cases, such agitation will be sufficient in the absence of a wetting agent. However, when no wetting agent is used, it will usually be necessary to employ mechanical agitators to provide sufficient agitation.

The body of scrubbing liquid in the reservoir should be maintained at a substantially constant volume. Large variations in such volume will affect the operation of the pumps or other equipment which force the scrubbing liquid to the scrubber and to the carbon black separating means, and will cause variation in the concentration of carbon black in the scrubbing liquid, thereby unnecessarily complicating control of the operation. Water will be added to the reservoir to replace that going to the carbon black separating means and that lost by evaporation in the scrubber and in the liquid-gas separating chamber. When the carbon black is separated from the scrubbing liquid by filtration or similar mechanical means, the filtrate is advantageously returned to the reservoir as replenishing water.

The washing zone may be preceded by the usual electrical precipitators and cyclone collectors, i. e., the gaseous suspension may be first passed through the usual electrical precipitators and cyclone collectors where a large portion of the carbon black will be collected in a dry finely-divided form. The remaining gaseous suspension will be then passed through the washing zone to wash the remainder of the carbon black from the gas. In such case, the scrubbing liquid removed from the reservoir (product slurry) can be sprayed into the hot gaseous suspension from the furnace to cool such gaseous suspension and to at the same time dry the carbon black and resuspend it in the gaseous suspension so that it may be recovered in the electrical precipitator and cyclone collectors in the dry finely-divided form. Such sprayed product slurry will replace all or a part of the cooling water which would otherwise be used in the cooling zone. Because of the small amount of liquid in such product slurry, it can be sprayed into the hot gaseous suspension with complete evaporation of all of the water therefrom. Also, because such product slurry is available at a substantially constant rate and because the variations in the concentration of the carbon black therein are maintained within a small narrow range, it can be so sprayed at a substantially constant rate to provide a predetermined substantially constant degree of cooling. Thereby such cooling can be readily controlled and such use of the product slurry is rendered entirely practicable.

Alternatively, when the scrubber is employed in combination with an electrical precipitator and cyclone collectors, the product slurry may be passed to a filter where it is collected as a wet filter cake. By maintaining the concentration of carbon black in the body of scrubbing liquid within the specified range, the volume of liquid which must be handled and its viscosity is such that it is within the capacity of filtering apparatus of moderate and economical size. Such wet filter cake can be collected and added to natural or synthetic rubber latices or used for other purposes for which aqueous pastes of carbon black are employed. Preferably, the wet filter cake will be passed to pelletizing and drying apparatus of known type. By such operation, the portion of the carbon black collected in the electrical precipitator and cyclone collectors is recovered in a dry finely-divided form, and that, washed from the gaseous suspension by the scrubbing liquid, is recovered in paste or in pelletized form.

All of the carbon black may be obtained in paste or in pelletized form by omitting the electrical precipitator and cyclone collectors and passing the hot gaseous suspension from the furnace, preferably after being cooled in the usual manner, directly to the washing zone. Thereby all of the carbon black from the furnace will be collected in the scrubbing liquid. The scrubbing liquid removed from the reservoir (product slurry) will be passed to the filtering, pelletizing and drying apparatus as described in the preceding paragraph.

For practical and economical operation of the carbon black recovery systems, the minimum concentration of the carbon black in the body of scrubbing liquid should be about 1.25% by weight. The maximum concentration normally should not be more than that which will produce scrubbing liquid having a viscosity of 15 centipoises at 30° C. and less than 10% by weight. Usually, it is preferred to have the carbon black in a concentration such that the body of scrubbing liquid has a viscosity of from about 5 to about 11 centipoises at 30 C. As has been pointed out heretofore, the concentration of carbon black which will produce a slurry having a given viscosity varies with the size and character of the carbon black and upon the presence or absence of a wetting agent. In the absence of a wetting agent, the concentration of carbon black which will provide a viscosity of 15 cps. at 30° C. varies from about 3% by weight for extremely fine nonagglomerated carbon black up to about 7% for coarse or agglomerated carbon black. In the presence of about 1% by weight of an effective wetting agent, a viscosity of 15 cps. is reached at a concentration of about 8.5% by weight for extremely fine nonagglomerated carbon black and at a concentration somewhat above 10% for very coarse or highly agglomerated carbon black. In the presence of larger excessive amounts of wetting agent, considerably higher concentrations of carbon black are required to produce a viscosity of 15 cps. at 30° C. However, as pointed out heretofore, concentrations above 10% by weight are objectionable for other reasons and are to be avoided.

Wetting agents tend to cause foaming of the scrubbing liquid, particularly in the washing zone and in the reservoir, which is objectionable. Therefore, they must be maintained at a low concentration.

When a wetting or deflocculating agent is used in the scrubbing liquid, it will usually be employed in a proportion of approximately 0.03% by weight of the carbon black, calculated on the maximum concentration of carbon black that is to be attained in the scrubbing liquid in the reservoir. The wetting or deflocculating agent may be any of the many that are known for forming suspensions of carbon black in water. Representative wetting and deflocculating agents are alkyl naphthalene sulfonates, long chain alkyl sulfates, fatty acid soaps, alkanol amines, and water-soluble derivatives of lignin such as lignosulfonates and alkali salts of lignin.

In the process of this invention, it is much preferred to not employ a wetting agent in the scrubbing liquid. The wetting agents assist very little in the collection of the carbon black, but act primarily to reduce the viscosity of the carbon black slurry. When the slurry contains wetting agent and the carbon black is separated by drying at a fairly low temperature or by filtration, the dried or separated carbon black contains practically all of the wetting agent adsorbed on the particles of carbon black and is carried by them into compositions, such as rubber, in which the carbon black is used. However, wetting agents are objectionable in rubber and in other compositions. Therefore, the use of wetting agents in the scrubbing liquid results in the production of carbon black of limited utility.

The body of scrubbing liquid should have a volume of from about 160 gallons to about 1200 gallons for each pound of carbon black that is normally (exclusive of sudden slugs of carbon black) washed from the gaseous suspension in one minute. This corresponds to from about 1,333 to about 10,000 pounds of water to each pound of carbon black. This permits the operation of the washing system for periods of from 10 to 75 minutes, during shut down of the carbon black recovery system, without increasing the concentration of the carbon black in the body of scrubbing liquid more than 0.75%. Usually, the body of scrubbing liquid will have a volume of from about 400 gallons (about 3,330 lbs. of water) to about 1,200 gallons per pound of carbon black that is normally washed from the gaseous suspension in one minute, preferably from about 550 gallons (about 4,583 lbs. of water) to about 1,200 gallons, particularly when the washing zone is preceded by a dry precipitating zone such as electrical precipitators and cyclone collectors. This permits the operation of the washing system, during shut down of the carbon black recovery system, for periods of from about 16 to about 50 minutes, preferably from about 23 to about 50 minutes, without increasing the concentration of carbon black in the body of scrubbing liquid more than 0.5%; and also tolerates the sudden slugs of carbon black which come from the dry precipitating zone without increasing the concentration of carbon black in the body of scrubbing liquid more than 0.5%.

This invention may be more readily understood from the detailed description hereinafter given in connection with the accompanying drawings which illustrate suitable types of apparatus for carrying out the process of this invention and in which.

Figure 1:
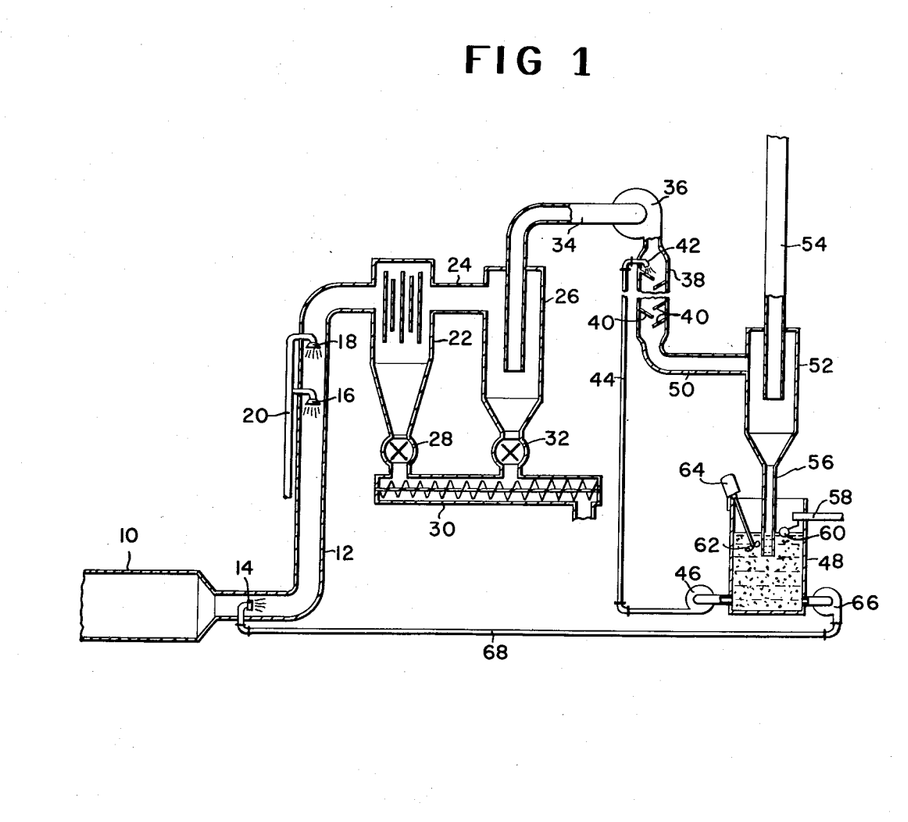
Figure 1 is a somewhat diagrammatic view in elevation of one form of apparatus for carrying out one embodiment of the invention, parts being broken away for clearness of illustration.

Referring more particularly to Figure 1, the exit end of the carbon black furnace is indicated at 10 and is connected with a cooling conduit 12 provided with spray heads 14, 16 and 18. The spray heads 16 and 18 are connected with a water supply pipe 20 leading from a suitable water supply, not shown. The conduit 12 is connected with an electrical precipitator 22 which, in turn, is connected with a cyclone collector 26 through a pipe 24. The electrical precipitator and the cyclone collector are conventional and well known and are similar to those disclosed by Hanson et al. in Patent 2,368,828 and by Mitchell et al. in Patent 2,417,606. The lower end of the electrical precipitator is provided with a star valve 28 which feeds the carbon black, collected in the electrical precipitator, into a screw conveyor 30 which conveys the carbon black to storage or bagging equipment, not shown. The lower end of the cyclone collector is also provided with a star valve 32 which feeds the carbon black collected therein to the screw conveyor 30.

The cyclone collector is also provided with an exit gas pipe 34 which leads to a blower 36 of conventional construction. The exhaust of the blower is connected to a scrubber 38 of a type well known to the art and is similar in construction and in operation to that shown by Brundage in Figures 6 and 7 of Patent 2,203,592.

In Figure 1, only one section of the scrubber is shown in vertical cross-sectional looking along the length of such section. The scrubber contains two such sections in parallel, each section being 5 feet long, 6 inches wide and 2.5 feet high and being provided with two vertical series of five rectangular baffles 40 extending inward and downward from the side walls of the section. The baffles in each series approach and overlap the baffles in the other series so that the space, between the tip of each baffle and the upper surface of the opposing lower baffle, is 2 inches. A plurality of spray heads 42 are positioned over the upper baffles and spaced along their length so as to distribute scrubbing liquid over the surfaces of the baffles. The scrubbing liquid is supplied to the spray heads 42 by a supply pipe 44 through which the scrubbing liquid is forced by a pump 46 from the body of scrubbing liquid in a reservoir 48.

The lower end of the scrubber is connected by a conduit 50 to a liquid-gas separator 52 which is in the form of a cyclone separator. The separator is provided with an exhaust stack 54 leading to the atmosphere. The lower end of the separator is provided with a drain pipe 56 discharging into the reservoir 48.

A water supply pipe 58 extends into the top of the reservoir 48. The flow of water through the pipe 58 is controlled by a valve operated by float 60 in a conventional and well-known manner. A propeller type agitator 62 extends into the body of scrubbing liquid in the reservoir and is operated by a motor 64. A pump 66 is connected with an outlet near the bottom of the reservoir and forces scrubbing liquid through pipe 68 to spray head 14.

The furnace 10 is operated to form carbon black by the thermal decomposition of liquid or gaseous hydrocarbons. The resulting hot gaseous suspension of carbon black passes into the cooling conduit 12 where they are cooled to a temperature of from about 212° F. to about 500° F. by sprays of water from spray heads 16 and 18. The cooled gaseous suspension then passes through the electrical precipitator 22 where much of the carbon black is flocculated and some of it falls to the bottom of the precipitator. The remaining gaseous suspension, containing most of the flocculated carbon black, passes to the cyclone collector 26 where a large portion of the carbon black is retained and is collected.

The gases, leaving the cyclone collector 26, still contain a substantial amount of carbon black in suspension therein. Such gaseous suspension is passed through blower 36 which supplies the pressure necessary to force the gaseous suspension through the scrubber 38 at the velocity required to produce the desired turbulence. Such pressure is usually such as to result in a pressure drop of from about 1 to about 6 inches of water through the scrubber. At the same time, scrubbing liquid, which may initially be water, is pumped from reservoir 48 and introduced into the top of the scrubber through spray heads 42 and sprayed over the upper baffles in an amount sufficient to completely wet the baffles and the walls of the scrubber and to wash any carbon collected therein out of the scrubber. The gaseous suspension impinges on the films or sheets of water on the baffles and the walls of the scrubber and also passes through the water flowing off the edges of the baffles. Thereby the carbon black in the gaseous suspension is transferred to the water and becomes suspended therein.

The cleaned gases and the carbon laden scrubbing liquid pass out of the bottom of the scrubber and into the liquid-gas separator 52, mainly as a stream and partly as a spray. In the liquid-gas separator, the carbon laden scrubbing liquid is separated from the cleaned gases. The cleaned gases may be passed directly to the atmosphere but, preferably, will first pass through a centrifugal fan where any remaining scrubbing liquid, carried by the gases in the form of a mist, is separated.

The carbon laden scrubbing liquid, from the liquid-gas separator and from the centrifugal fan, is passed to the body of scrubbing liquid in the reservoir 48. The scrubbing liquid is continuously pumped from the reservoir and recirculated through the scrubber until the amount of carbon black in the scrubbing liquid is increased to the desired concentration. When the carbon black in the scrubbing liquid has reached such concentration, a portion thereof is removed by pump 66 and sprayed through spray head 14 into the hot gaseous suspension in the cooling conduit 12. The scrubbing liquid is so removed from the reservoir at a substantially constant rate equivalent to the average rate at which carbon black is washed from the gaseous suspension in the scrubber. While the scrubbing liquid is being sprayed into the hot gaseous suspension, the amount of cooling water, introduced through sprays 16 and 18, will be reduced by an amount which is equal to the amount of water that is introduced through spray head 14 with the scrubbing liquid. By contact with the hot gaseous suspension from the furnace, the water, in the scrubbing liquid introduced through spray head 14, will be evaporated and cool the hot gaseous suspension. At the same time, the carbon black in the scrubbing liquid will be separated, dried, suspended in the gaseous suspension, carried to the electrical precipitator and cyclone collector, and collected therein as dry finely-divided carbon black.

Throughout the operation, the volume of liquid in the reservoir will be automatically maintained substantially constant by the flow of fresh water to the reservoir controlled by float 60. When necessary, the body of liquid in the reservoir will be agitated by agitator 62 to disperse the carbon black throughout the body of scrubbing liquid and to maintain it suspended therein.

Figure 2:
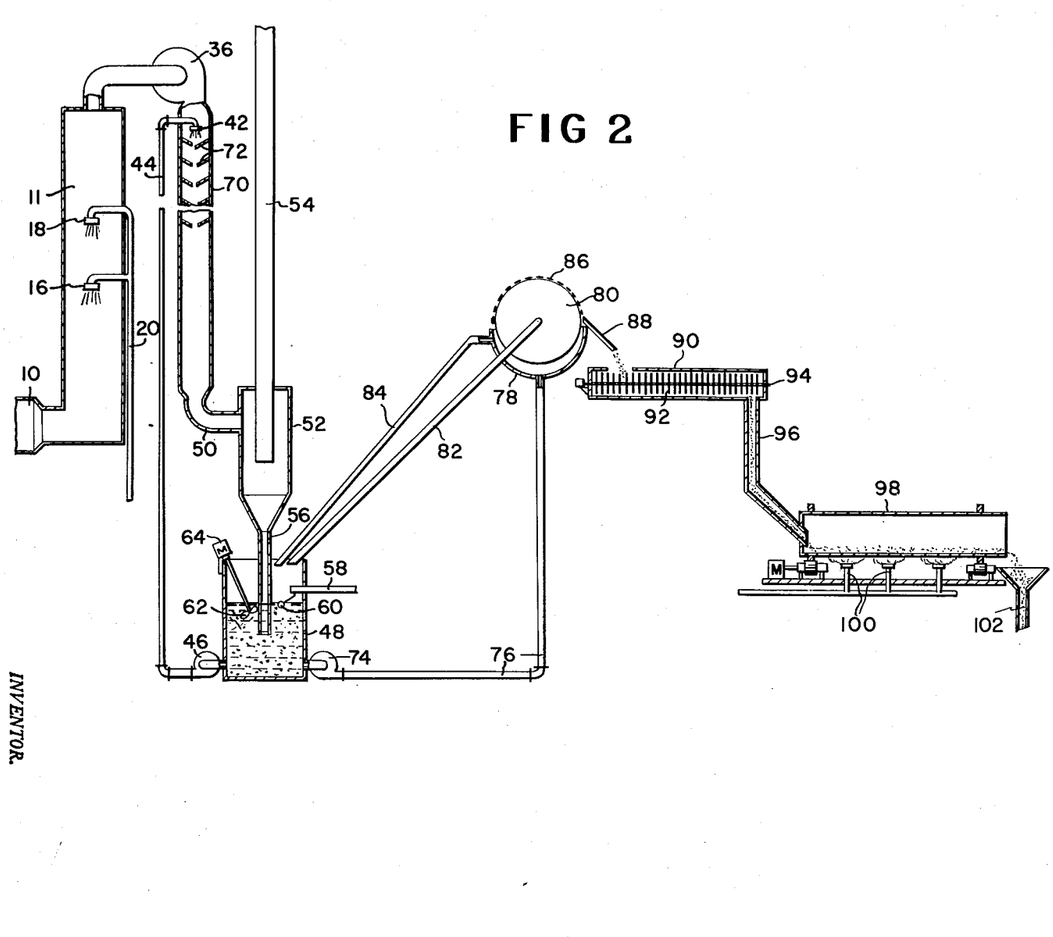
Figure 2 is a similar view of another form of apparatus for carrying out a second embodiment of the invention.

In the modification shown in Figure 2, the end of the carbon black furnace 10 is connected with a cooling tower 11 which is provided with spray heads 16 and 18 connected with a water supply pipe 20. The spray tower is connected directly to a blower 36 which discharges into the scrubber 70.

As in Figure 1, Figure 2 shows an end view of only one of four parallel sections of the scrubber in vertical cross-section. Each section is about 4 feet long, 7 inches wide and 3 feet high and contains two vertical series of five rectangular baffles 72 extending inward and downward from the side walls. The baffles in each series approach the baffles of the other so that the tips of the opposing baffles are spaced apart by about 1.75 inches.

Also, as in Figure 1, spray heads 42 are positioned over the upper baffles to distribute scrubbing liquid over the surfaces thereof. The scrubbing liquid is supplied to spray heads 42 from reservoir 48 by means of pump 46 and supply pipe 44. Also, the lower end of the scrubber is connected to cyclone separator 52 by conduit 50. The separator discharges cleaned gas through stack 54, and scrubbing liquid through drain pipe 56 into reservoir 48. The reservoir is similarly provided with water supply pipe 58 controlled by a valve and float 60. Also, a propeller type agitator 62, operated by a motor 64, extends into the scrubbing liquid in the reservoir.

A pump 74 is connected with an outlet near the bottom of the reservoir and forces scrubbing liquid through pipe 76 to the pan 78 of an 8 foot by 8 foot rotary vacuum filter 80. Such filter, sometimes called a drum filter, is conventional in construction and is well known to the art. The filtrate from the filter is returned to the reservoir by pipe 82. The pan of the filter is provided with an overflow pipe 84 leading back into the reservoir.

A knife 88 bears against the outer surface of the drum filter to scrape off the filter cake 86 which contains from about 25% to about 35% by weight of carbon black and form about 75% to about 65% water. The filter cake falls into a pelletizer 90 which contains a large number of pins 92 mounted on a rotating shaft 94. The pelletizer discharges through a pipe 96 into a rotating cylindrical dryer 98 which is heated externally by gas burners 100. The dryer discharges into a chute 102. The pelletizer and dryer are of conventional construction and operation well known to the art. They conform generally to the structures disclosed by Heller et al. in Patent 2,131,686 and by Glaxner in Re. 21,379.

In the embodiment shown in Figure 2, the hot gaseous suspension from the carbon black furnace passes through the cooling tower 11 and is sprayed with water introduced through spray heads 16 and 18 to cool the gaseous suspension to a temperature between about 212° F. and about 500° F. The cooled gaseous suspension is then passed directly to blower 36 which forces it through the scrubber 70. At the same time, scrubbing liquid is also pumped from reservoir 48 and introduced into the top of the scrubber by spray head 42. The scrubbing liquid and the washed gases will pass from the bottom of the scrubber into the liquid-gas separator 52. The separated scrubbing liquid will then pass into the reservoir 48 from which it will be recirculated through the scrubber. The operation of the scrubber, the liquid-gas separator, and the reservoir, in this modification, is similar to the operation of the corresponding pieces of equipment of Figure 1.

Also, in the modification of Figure 2, the scrubbing liquid, when the concentration of carbon black therein has been increased to the desired extent, is pumped out of the reservoir by pump 74 at a substantially constant rate equivalent to the average rate at which carbon black is washed from the gaseous suspension in the scrubber. Such removed scrubbing liquid is passed to the rotary filter 80 where the carbon black is separated as a wet filter cake and the filtrate is returned to the reservoir. The wet filter cake is scraped from the filter and drops into the pelletizer 90 where it is broken up into small particles which are discharged into the rotating cylindrical dryer 98. The dryer forms the particles of carbon black into round pellets and dries them, while advancing them to the discharge end where they are discharged into chute 102. The carbon black pellets pass from the chute 102 to storage or to bagging equipment, not shown.

It will be understood that the embodiments of Figures 1 and 2 may be combined; that is, the scrubbing liquid, which is removed from the reservoir of Figure 1 by pump 66, may be passed to the filter 80 and to the pelletizer and dryer as in Figure 2. By such combination, a large portion of the carbon black will be collected in the dry finely-divided form in the electrical precipitator 22, the cyclone collector 26 and the screw conveyor 30, and the remainder of the carbon black will be recovered either as wet filter cake or as dried pellets, as desired.

It will be noted that, in both figures, the hot gaseous suspension from the furnace is cooled by aqueous sprays. While such cooling is preferred, it may be omitted where scrubbing liquid is not sprayed into such hot gaseous suspension and where an electrical precipitator or like equipment is either not used or is not damaged by the high temperatures involved. Particularly, in the embodiment of Figure 2, such preliminary cooling may, optionally, be omitted. When preliminary cooling is omitted, the volume of scrubbing liquid in the scrubbing system, particularly that in the scrubber, will be increased by an amount at least equal to the water that will be evaporated and removed from the system by the hot gases.

In order to more clearly illustrate this invention, preferred modes of carrying the same into effect and the advantageous results obtained thereby, the following examples are given:

*Example I*

A system was arranged to operate as in Figure 1. The furnace produced a grade of very fine carbon black from oil. The electrical precipitator and collecting cyclone operated at an efficiency of about 92% and passed 12,000 C. F. M. of gas at 350° F. to the scrubber. This gas carried about 1 pound per minute of carbon black to the scrubber, the carbon having a mean particle diameter of about 23 millimicrons. The pressure drop through the scrubber was about 2.5 inches of water. The sprays delivered scrubbing liquid, which contained no wetting agent, to the scrubber at the rate of 75 gallons per minute. The carbon laden scrubbing liquid and gases were separated in the cyclone separator which was 5 feet in diameter and 10 feet high. The cleaned gases carried carbon black at the rate of only about one-half pound per hour. The cyclone discharged the carbon laden water into the reservoir which contained 1,200 gallons of scrubbing liquid, equivalent to about 10,000 pounds of water. The concentration of carbon black, in the water first discharged from the cyclone, was 0.16% by weight. The suspension was recirculated through the scrubber until the concentration of carbon black had increased to 2.5% by weight, the viscosity of the suspension increasing to about 8 centipoises at 30° C. The temperature of the scrubbing liquid reached 180° F. by contact with the hot gases, and remained at this temperature during the rest of the run. At this time, 4.8 gallons per minute of scrubbing liquid were pumped from the reservoir and sprayed into the hot gas stream from the furnace to evaporate the water and free the carbon black. This amount of scrubbing liquid was sufficient to balance the average amount of carbon black being caught by the scrubbing liquid, and the concentration of carbon black in the body of scrubbing liquid then remained substantially constant. Final cooling of the carbon laden gases, before entering the electrical precipitator, was done with clear water. With the scrubber in operation, the electrical precipitator and cyclone collected carbon black at the rate of 11.4 pounds per minute when the carbon black suspension was not being sprayed into the hot gases, and at the rate of 12.3 lbs. per minute when the carbon black suspension was being sprayed into the hot gases from the furnace.

In the event that the removal of scrubbing liquid from the reservoir for spraying into the hot gas stream from the furnace is stopped, the concentration of carbon black in the body of scrubbing liquid will increase at the rate of 0.01% per minute. Accordingly, this system will tolerate stoppages of scrubbing liquid removal for 50 minutes or a 50 pound slug of carbon black, without increasing the concentration of carbon black in the body of scrubbing liquid more than 0.5%. This system could also be operated reasonably satisfactorily with a body of scrubbing liquid of 600 gallons which would tolerate stoppages of scrubbing liquid removal of 25 minutes and 25 pound slugs of carbon black without increasing the concentration of carbon black in the body of scrubbing liquid more than 0.5%. A 400 gallon body of scrubbing liquid will permit stoppages of more than 16 minutes or slugs of more than 16.6 pounds of carbon black without more than 0.5% increase in concentration, or stoppages of 10 minutes and 10 pound slugs of carbon black without increasing the concentration more than 0.3%.

*Example II*

Another run was conducted similarly to Example I. However, in this case, a lignin derivative wetting agent, known as "Marasperse," was added to the water used in the scrubber system so that the wetting agent was present to the extent of 0.03% of the weight of the carbon black. All fresh water, added to the system, contained wetting agent sufficient to keep this amount present. In the presence of the wetting agent, it was found that the scrubbing liquid wet the carbon black more completely, and it was possible to build up the concentration of carbon black in the circulating liquid to 5%, without increasing the viscosity of the liquid so that it could not be recirculated and sprayed effectively, the liquid suspension having a viscosity of about 11 centipoises, at 30° C. In this case, only 2.4 gallons of carbon black slurry per minute were sprayed into the hot furnace gases for evaporation. This was sufficient to maintain the carbon black concentration, in the scrubbing liquid circulated through the scrubber, at substantially 5%.

*Example III*

The form of apparatus shown in Figure 2 was used. A furnace, burning 2,500 C. F. M. of natural gas and 10,500 C. F. M. of air, produced the carbon laden gases which carried about 15 pounds per minute of carbon black having a mean particle diameter of about 56 millimicrons. These were cooled to a temperature of 350° F. by spraying with water. The cooled gases were passed directly through the scrubber at a velocity such that the pressure drop through the scrubber was about 3.5 inches of water. The gas and carbon laden scrubbing liquid were separated in the cyclone separator. The gases, which were discharged, showed the presence of only a trace of carbon black. The carbon laden scrubbing liquid discharged into the reservoir which contained 2,400 gallons of scrubbing liquid (equivalent to 20,000 pounds of water) which was strongly agitated. The scrubbing liquid, originally consisting of water, was circulated from the reservoir through the scrubber at the rate of 125 gallons per minute until the carbon black concentration was 5% and the water temperature was 175° F. The scrubbing liquid then had a viscosity of about 5 centipoises at 30° C. At this time, 36 gallons per minute of the scrubbing liquid was pumped to the pan of the 8 foot by 8 foot rotary filter which was operated at 5 revolutions per hour and a vacuum of 15 pounds. Under these conditions, no slurry overflowed and returned to the reservoir. The filtrate was returned to the scrubbing liquid in the reservoir. The filter cake contained 28% of carbon black and was discharged into the pin type agitator conveyor, where it was broken into small granules, and conveyed to the rotary drier. Dried carbon black pellets were produced at the rate of 900 pounds per hour.

In this instance, the body of scrubbing liquid was of a size to permit stoppage of removal of scrubbing liquid for 10 minutes without increasing the concentration of the carbon black in the body of scrubbing liquid more than 0.75%. Longer periods of stoppage can be provided for by increasing the size of the reservoir and the body of scrubbing liquid. Since the carbon black gases from the furnace are passed almost directly into the scrubber in this system, there is little or no danger of substantial slugs of carbon black entering the scrubber.

*Example IV*

The apparatus and operation of Example III was used, except that two filter presses were substituted for the rotary filter. The scrubbing liquid, containing 5% carbon black and having a viscosity of about 5 centipoises at 30° C., was pumped to the presses under a pressure of 80 pounds per square inch. When the first press was nearly full, scrubbing liquid was also pumped to the second press. In this way, the two presses were used simultaneously for about 20 minutes. As in normal filter press operation, the rate of flow of the scrubbing liquid into each press decreased as the press filled. This resulted in some small variation in the concentration of carbon black in the scrubbing liquid, being somewhat lower during the first part of the operation of each press and increasing as the operation proceeded, due to decrease in the rate at which liquid is withdrawn from the body of scrubbing liquid and at which water is added to such system. The first press was opened and discharged. The filter cake was found to contain 34% of carbon. When the second press was nearly filled, the first press was again put into operation. The cycle of operation of each press was about 4 hours. All filtrate was returned to the scrubber system. The press cakes were pelletized and dried as in Example III.

*Example V*

This was a duplication of Example IV, except that the wetting agent was added to the scrubbing liquid as in Example II and the concentration of carbon black in the scrubbing liquid was raised to 7.5%, the viscosity of the scrubbing liquid again being about 5 centipoises at 30° C. The filtration rate was slightly lower but, since less water was removed per pound of carbon black, the filter cycle remained at about 4 hours.

It will be understood that the apparatus shown in the drawings and the embodiments described in the examples are given for illustrative purposes solely, and that this invention is not limited to any specific apparatus or to any specific embodiment so disclosed. It will be apparent to those skilled in the art that the structure of the apparatus may be widely varied and equivalent apparatus of different structure may be substituted therefor. For example, the electrical precipitator may be replaced by apparatus for flocculating the carbon black by ultrasonic vibration. The cyclone collector may be replaced by other types of collectors, other types of cyclone collectors such as those disclosed by Heller in Patent 2,439,850, or by a plurality of cyclone collectors. Also, the scrubbers may be replaced by other types of scrubbers that are known to be suitable for washing gaseous suspensions with water. Still other modifications can be made in the equipment and in the mode of operation, as hereinbefore indicated in the general description.

It will be apparent from the preceding description that this invention provides a novel and improved method for effectively removing carbon black from gaseous suspensions thereof in such a manner that such carbon black can be readily recovered in a variety of useful forms, and particularly so that all parts of the system can be easily controlled, and the furnace and washing system can be operated continuously over long periods of time. By this invention, the carbon black is removed from the gaseous suspension and recovered in a simple and economical manner which is commercially practical and which overcomes many of the problems and difficulties encountered in other processes. Therefore, it will be apparent that this invention constitutes a valuable contribution to and advance in the art.

What is claimed is:

1. The process for recovering furnace carbon black from a gaseous suspension thereof which comprises continuously passing the gaseous suspension through a washing zone and therein washing the carbon black therefrom with an attenuated stream of a scrubbing liquid which consists essentially of a fluid aqueous slurry of such carbon black, continuously passing the resulting mixture of scrubbing liquid and carbon black from the washing zone and into a body of said scrubbing liquid in a reservoir, said body of scrubbing liquid having a volume of from about 160 gallons to about 1200 gallons for each pound of carbon black that is normally washed from the gaseous suspension in one minute and normally containing said carbon black in a concentration between about 1.25% and 10% by weight but less than that concentration which will increase the viscosity of the scrubbing liquid to above 15 centipoises at 30° C., dispersing the mixture of scrubbing liquid and carbon black from the washing zone approximately uniformly throughout said body of scrubbing liquid and maintaining the carbon black in suspension in said body of scrubbing liquid by agitating said body of scrubbing liquid, maintaining said body of scrubbing liquid at a substantially constant volume by the automatic addition of water thereto, continuously recirculating scrubbing liquid from said body thereof to the washing zone as the scrubbing liquid in said zone, continuously withdrawing scrubbing liquid from the body thereof at a substantially constant rate equivalent to the average rate at which the carbon black is washed from the gaseous suspension, and passing said withdrawn scrubbing liquid to a carbon black recovery system and there separating the carbon black from the scrubbing liquid.

2. The process for recovering furnace carbon black from a gaseous suspension thereof which comprises continuously passing the gaseous suspension through a washing zone and therein washing the carbon black therefrom with an attenuated stream of a scrubbing liquid which consists of a fluid aqueous slurry of such carbon black in water, continuously passing the resulting mixture of scrubbing liquid and carbon black from the washing zone and into a body of said scrubbing liquid in a reservoir, said body of scrubbing liquid having a volume of from about 160 gallons to about 1200 gallons for each pound of carbon black that is normally washed from the gaseous suspension in one minute and normally containing said carbon black in a concentration such that the scrubbing liquid has a viscosity of from about 5 to about 11 centipoises at 30° C. but less than 10% by weight, dispersing the mixture of scrubbing liquid and carbon black from the washing zone approximately uniformly throughout said body of scrubbing liquid and maintaining the carbon black in suspension in said body of scrubbing liquid by agitating said body of scrubbing liquid, maintaining said body of scrubbing liquid at a substantially constant volume by the automatic addition of water thereto, continuously recirculating scrubbing liquid from said body thereof to the washing zone as the scrubbing liquid in said zone, continuously withdrawing scrubbing liquid from the body thereof at a substantially constant rate equivalent to the average rate at which the carbon black is washed from the gaseous suspension, and passing said withdrawn scrubbing liquid to a carbon black recovery system and there separating the carbon black from the scrubbing liquid.

3. The process for recovering furnace carbon black from a gaseous suspension thereof which comprises continuously passing the gaseous suspension through a washing zone and therein washing the carbon black therefrom with an attenuated stream of a scrubbing liquid which consists essentially of a fluid aqueous slurry of such carbon black, continuously passing the resulting mixture of scrubbing liquid and carbon black from the washing zone and into a body of said scrubbing liquid in a reservoir, said body of scrubbing liquid having a volume of from about 400 gallons to about 1200 gallons for each pound of carbon black that is normally washed from the gaseous suspension in one minute and normally containing said carbon black in a concentration between about 1.25% and 10% by weight but less than that concentration which will increase the viscosity of the scrubbing liquid to above 15 centipoises at 30° C., dispersing the mixture of scrubbing liquid and carbon black from the washing zone approximately uniformly throughout said body of scrubbing liquid and maintaining the carbon black in suspension in said body of scrubbing liquid by agitating said body of scrubbing liquid, maintaining said body of scrubbing liquid at a substantially constant volume by the automatic addition of water thereto, continuously recirculating scrubbing liquid from said body thereof to the washing zone as the scrubbing liquid in said zone, continuously withdrawing scrubbing liquid from the body thereof at a substantially constant rate equivalent to the average rate at which the carbon black is washed from the gaseous suspension, and passing said withdrawn scrubbing liquid to a carbon black recovery system and there separating the carbon black from the scrubbing liquid.

4. The process for recovering furnace carbon black from a gaseous suspension thereof which comprises continuously passing the gaseous suspension through a washing zone and therein washing the carbon black therefrom with an attenuated stream of a scrubbing liquid which consists of a fluid aqueous slurry of such carbon black in water, continuously passing the resulting mixture of scrubbing liquid and carbon black from the washing zone and into a body of said scrubbing liquid in a reservoir, said body of scrubbing liquid having a volume of from about 400 gallons to about 1200 gallons for each pound of carbon black that is normally washed from the gaseous suspension in one minute and normally containing said carbon black in a concentration such that the scrubbing liquid has a viscosity of from about 5 to about 11 centipoises at 30° C. but less than 10% by weight, dispersing the mixture of scrubbing liquid and carbon black from the washing zone approximately uniformly throughout said body of scrubbing liquid and maintaining the carbon black in suspension in said body of scrubbing liquid by agitating said body of scrubbing liquid, maintaining said body of scrubbing liquid at a substantially constant volume by the automatic addition of water thereto, continuously recirculating scrubbing liquid from said body thereof to the washing zone as the scrubbing liquid in said zone, continuously withdrawing scrubbing liquid from the body thereof at a substantially constant rate equivalent to the average rate at which the carbon black is washed from the gaseous suspension, and passing said withdrawn scrubbing liquid to a carbon black recovery system and there separating the carbon black from the scrubbing liquid.

5. The process for recovering carbon black from a hot gaseous suspension thereof produced by a carbon black furnace which comprises continuously passing the gaseous suspension through a dry precipitating zone and there separating a large portion of the carbon black from the gaseous suspension in a dry state, then continuously passing the gaseous suspension through a washing zone and therein washing the remaining carbon black therefrom with an attenuated stream of a scrubbing liquid which consists essentially of a fluid aqueous slurry of such carbon black, continuously passing the resulting mixture of scrubbing liquid and carbon black from the washing zone and into a body of said scrubbing liquid in a reservoir, said body of scrubbing liquid having a volume of from about 400 gallons to about 1200 gallons for each pound of carbon black that is normally washed from the gaseous suspension in one minute and normally containing said carbon black in a concentration between about 1.25% and 10% by weight but less than that concentration which will increase the viscosity of the scrubbing liquid to above 15 centipoises at 30° C., dispersing the mixture of scrubbing liquid and carbon black from the washing zone approximately uniformly throughout said body of scrubbing liquid and maintaining the carbon black in suspension in said body of scrubbing liquid by agitating said body of scrubbing liquid, maintaining said body of scrubbing liquid at a substantially constant volume by the automatic addition of water thereto, continuously recirculating scrubbing liquid from said body thereof to the washing zone as the scrubbing liquid in said zone, continuously withdrawing scrubbing liquid from the body thereof at a substantially constant rate equivalent to the average rate at which the carbon black is washed from the gaseous suspension, and passing said withdrawn scrubbing liquid to a carbon black recovery system and there separating the carbon black from the scrubbing liquid.

6. The process for recovering carbon black from a hot gaseous suspension thereof produced by a carbon black furnace which comprises continuously passing the gaseous suspension through a dry precipitating zone and there separating a large portion of the carbon black from the gaseous suspension in a dry state, then continuously passing the gaseous suspension through a washing zone and therein washing the remaining carbon black therefrom with an attenuated stream of a scrubbing liquid which consists of a fluid slurry of such carbon black in water, continuously passing the resulting mixture of scrubbing liquid and carbon black from the washing zone and into a body of said scrubbing liquid in a reservoir, said body of scrubbing liquid having a volume of from about 400 gallons to about 1200 gallons for each pound of carbon black that is normally washed from the gaseous suspension in one minute and normally containing said carbon black in a concentration between about 1.25% and 10% by weight but less than that concentration which will increase the viscosity of the scrubbing liquid to above 15 centipoises at 30° C., dispersing the mixture of scrubbing liquid and carbon black from the washing zone approximately uniformly throughout said body of scrubbing liquid and maintaining the carbon black in suspension in said body of scrubbing liquid by agitating said body of scrubbing liquid, maintaining said body of scrubbing liquid at a substantially constant volume by the automatic addition of water thereto, continuously recirculating scrubbing liquid from said body thereof to the washing zone as the scrubbing liquid in said zone, continuously withdrawing scrubbing liquid from the body thereof at a substantially constant rate equivalent to the average rate at which the carbon black is washed from the gaseous suspension, and passing said withdrawn scrubbing liquid to a carbon black recovery system and there separating the carbon black from the scrubbing liquid.

7. The process for recovering carbon black from a hot gaseous suspension thereof produced by a carbon black furnace which comprises continuously passing the gaseous suspension through a dry precipitating zone and there separating a large portion of the carbon black from the gaseous suspension in a dry state, then continuously passing the gaseous suspension through a washing zone and therein washing the remaining carbon black therefrom with an attenuated stream of a scrubbing liquid which consists essentially of a fluid aqueous slurry of such carbon black, continuously passing the resulting mixture of scrubbing liquid and carbon black from the washing zone and into a body of said scrubbing liquid in a reservoir, said body of scrubbing liquid having a volume of from about 400 gallons to about 1200 gallons for each pound of carbon black that is normally washed from the gaseous suspension in one minute and normally containing said carbon black in a concentration such that the scrubbing liquid has a viscosity of from about 5 to about 11 centipoises at 30° C. but less than 10% by weight, dispersing the mixture of scrubbing liquid and carbon black from the washing zone approximately uniformly throughout said body of scrubbing liquid and maintaining the carbon black in suspension in said body of scrubbing liquid by agitating said body of scrubbing liquid, maintaining said body of scrubbing liquid at a substantially constant volume by the automatic addition of water thereto, continuously recirculating scrubbing liquid from said body thereof to the washing zone as the scrubbing liquid in said zone, continuously withdrawing scrubbing liquid from the body thereof at a substantially constant rate equivalent to the average rate at which the carbon black is washed from the gaseous suspension, and passing said withdrawn scrubbing liquid to a carbon black recovery system and there separating the carbon black from the scrubbing liquid.

8. The process for recovering carbon black from a hot gaseous suspension thereof produced by a carbon black furnace which comprises continuously passing the gaseous suspension through a dry precipitating zone and there separating a large portion of the carbon black from the gaseous suspension in a dry state, then continuously passing the gaseous suspension through a washing zone and therein washing the remaining carbon black therefrom with an attenuated stream of a scrubbing liquid which consists of a fluid slurry of such carbon black in water, continuously passing the resulting mixture of scrubbing liquid and carbon black from the washing zone and into a body of said scrubbing liquid in a reservoir, said body of scrubbing liquid having a volume of from about 400 gallons to about 1200 gallons for each pound of carbon black that is normally washed from the gaseous suspension in one minute and normally containing said carbon black in a concentration such that the scrubbing liquid has a viscosity of from about 5 to about 11 centipoises at 30° C. but less than 10% by weight, dispersing the mixture of scrubbing liquid and carbon black from the washing zone approximately uniformly throughout said body of scrubbing liquid and maintaining the carbon black in suspension in said body of scrubbing liquid by agitating said body of scrubbing liquid, maintaining said body of scrubbing liquid at a substantially constant volume by the automatic addition of water thereto, continuously recirculating scrubbing liquid from said body thereof to the washing zone as the scrubbing liquid in said zone, continuously withdrawing scrubbing liquid from the body thereof at a substantially constant rate equivalent to the average rate at which the carbon black is washed from the gaseous suspension, and passing said withdrawn scrubbing liquid to a carbon black recovery system and there separating the carbon black from the scrubbing liquid.

9. The process for recovering carbon black from a hot gaseous suspension thereof produced by a carbon black furnace which comprises continuously passing the hot gaseous suspension through a cooling zone and there cooling it to a temperature of from about 212° F. to about 500° F. by spraying it with an aqueous cooling liquid, continuously passing the cooled gaseous suspension through a dry precipitating zone and there separating a large portion of the carbon black from the gaseous suspension in a dry state, then continuously passing the gaseous suspension through a washing zone and therein washing the remaining carbon black therefrom with an attenuated stream of a scrubbing liquid which consists essentially of a fluid aqueous slurry of such carbon black, continuously passing the resulting mixture of scrubbing liquid and carbon black from the washing zone and into a body of said scrubbing liquid in a reservoir, said body of scrubbing liquid having a volume of from about 400 gallons to about 1200 gallons for each pound of carbon black that is normally washed from the gaseous suspension in one minute and normally containing said carbon black in a concentration between about 1.25% and 10% by weight but less than that concentration which will increase the viscosity of the scrubbing liquid to above 15 centipoises at 30° C., dispersing the mixture of scrubbing liquid and carbon black from the washing zone approximately uniformly throughout said body of scrubbing liquid and maintaining the carbon black in suspension in said body of scrubbing liquid by agitating said body of scrubbing liquid, maintaining said body of scrubbing liquid at a substantially constant volume by the automatic addition of water thereto, continuously recirculating scrubbing liquid from said body thereof to the washing zone as the scrubbing liquid in said zone, continuously withdrawing scrubbing liquid from the body thereof at a substantially constant rate equivalent to the average rate at which the carbon black is washed from the gaseous suspension, and passing said withdrawn scrubbing liquid to the cooling zone as aqueous cooling liquid and there spraying the hot gaseous suspension with it to cool such gaseous suspension, to evaporate the water from the carbon black in such liquid and to suspend the carbon black in the gaseous suspension.

10. The process for recovering carbon black from a hot gaseous suspension thereof produced by a carbon black furnace which comprises continuously passing the hot gaseous suspension through a cooling zone and there cooling it to a temperature of from about 212° F. to about 500° F. by spraying it with an aqueous cooling liquid, continuously passing the cooled gaseous suspension through a dry precipitating zone and there separating a large portion of the carbon black from the gaseous suspension in a dry state, then continuously passing the gaseous suspension through a washing zone and therein washing the remaining carbon black therefrom with an attenuated stream of a scrubbing liquid which consists of a fluid slurry of such carbon black in water, continuously passing the resulting mixture of scrubbing liquid and carbon black from the washing zone and into a body of said scrubbing liquid in a reservoir, said body of scrubbing liquid having a volume of from about 400 gallons to about 1200 gallons for each pound of carbon black that is normally washed from the gaseous suspension in one minute and normally containing said carbon black in a concentration between about 1.25% and 10% by weight but less than that concentration which will increase the viscosity of the scrubbing liquid to above 15 centipoises at 30° C., dispersing the mixture of scrubbing liquid and carbon black from the washing zone approximately uniformly throughout said body of scrubbing liquid and maintaining the carbon black in suspension in said body of scrubbing liquid by agitating said body of scrubbing liquid, maintaining said body of scrubbing liquid at a substantially constant volume by the automatic addition of water thereto, continuously recirculating scrubbing liquid from said body thereof to the washing zone as the scrubbing liquid in said zone, continuously withdrawing scrubbing liquid from the body thereof at a substantially constant rate equivalent to the average rate at which the carbon black is washed from the gaseous suspension, and passing said withdrawn scrubbing liquid to the cooling zone as aqueous cooling liquid and there spraying the hot gaseous suspension with it to cool such gaseous suspension, to evaporate the water from the carbon black in such liquid and to suspend the carbon black in the gaseous suspension.

11. The process for recovering carbon black from a hot gaseous suspension thereof produced by a carbon black furnace which comprises continuously passing the hot gaseous suspension through a cooling zone and there cooling it to a temperature of from about 212° F. to about 500° F. by spraying it with an aqueous cooling liquid, continuously passing the cooled gaseous suspension through a dry precipitating zone and there separating a large portion of the carbon black from the gaseous suspension in a dry state, then continuously passing the gaseous suspension through a washing zone and therein washing the remaining carbon black therefrom with an attenuated stream of a scrubbing liquid which consists essentially of a fluid aqueous slurry of such carbon black, continuously passing the resulting mixture of scrubbing liquid and carbon black from the washing zone and into a body of said scrubbing liquid in a reservoir, said body of scrubbing liquid having a volume of from about 400 gallons to about 1200 gallons for each pound of carbon black that is normally washed from the gaseous suspension in one minute and normally containing said carbon black in a concentration such that the scrubbing liquid has a viscosity of from about 5 to about 11 centipoises at 30° C. but less than 10% by weight, dispersing the mixture of scrubbing liquid and carbon black from the washing zone approximately uniformly throughout said body of scrubbing liquid and maintaining the carbon black in suspension in said body of scrubbing liquid by agitating said body of scrubbing liquid, maintaining said body of scrubbing liquid at a substantially constant volume by the automatic addition of water thereto, continuously recirculating scrubbing liquid from said body thereof to the washing zone as the scrubbing liquid in said zone, continuously withdrawing scrubbing liquid from the body thereof at a substantially constant rate equivalent to the average rate at which the carbon black is washed from the gaseous suspension, and passing said withdrawn scrubbing liquid to the cooling zone as aqueous cooling liquid and there spraying the hot gaseous suspension with it to cool such gaseous suspension, to evaporate the water from the carbon black in such liquid and to suspend the carbon black in the gaseous suspension.

12. The process for recovering carbon black from a hot gaseous suspension thereof produced by a carbon black furnace which comprises continuously passing the hot gaseous suspension through a cooling zone and there cooling it to a temperature of from about 212° F. to about 500° F. by spraying it with an aqueous cooling liquid, continuously passing the cooled gaseous suspension through a dry precipitating zone and there separating a large portion of the carbon black from the gaseous suspension in a dry state, then continuously passing the gaseous suspension through a washing zone and therein washing the remaining carbon black therefrom with an attenuated stream of a scrubbing liquid which consists of a fluid slurry of such carbon black in water, continuously passing the resulting mixture of scrubbing liquid and carbon black from the washing zone and into a body of said scrubbing liquid in a reservoir, said body of scrubbing liquid having a volume of from about 550 gallons to about 1200 gallons for each pound of carbon black that is normally washed from the gaseous suspension in one minute and normally containing said carbon black in a concentration such that the scrubbing liquid has a viscosity of from about 5 to about 11 centipoises at 30° C. but less than 10% by weight, dispersing the mixture of scrubbing liquid and carbon black from the washing zone approximately uniformly throughout said body of scrubbing liquid and maintaining the carbon black in suspension in said body of scrubbing liquid by agitating said body of scrubbing liquid, maintaining said body of scrubbing liquid at a substantially constant volume by the automatic addition of water thereto, continuously recirculating scrubbing liquid from said body thereof to the washing zone as the scrubbing liquid in said zone, continuously withdrawing scrubbing liquid from the body thereof at a substantially constant rate equivalent to the average rate at which the carbon black is washed from the gaseous suspension, and passing said withdrawn scrubbing liquid to the cooling zone as aqueous cooling liquid and there spraying the hot gaseous suspension with it to cool such gaseous suspension, to evaporate the water from the carbon black in such liquid and to suspend the carbon black in the gaseous suspension.

References Cited in the file of this patent

UNITED STATES PATENTS

| | | |
|---|---|---|
| 2,668,754 | Lichtenfels | Feb. 9, 1954 |
| 2,677,439 | Hedberg | May 4, 1954 |